(12) United States Patent
Haran

(10) Patent No.: US 9,425,883 B2
(45) Date of Patent: Aug. 23, 2016

(54) METHOD AND SYSTEM FOR SUPPORTING MULTI-CHANNEL DYNAMICALLY CONTROLLED DIVERSITY RECEPTION

(71) Applicant: AUTOTALKS LTD., Kfar Netter (IL)

(72) Inventor: Onn Haran, Bnei Dror (IL)

(73) Assignee: Autotalks LTD, Kfar Netter (IL)

( * ) Notice: Subject to any disclaimer, the term of this patent is extended or adjusted under 35 U.S.C. 154(b) by 91 days.

(21) Appl. No.: 14/491,985

(22) Filed: Sep. 20, 2014

(65) Prior Publication Data

US 2015/0296501 A1   Oct. 15, 2015

Related U.S. Application Data

(60) Provisional application No. 61/977,237, filed on Apr. 9, 2014.

(51) Int. Cl.
| | |
|---|---|
| *H04W 4/00* | (2009.01) |
| *H04B 7/08* | (2006.01) |
| *H04B 7/06* | (2006.01) |
| *H04B 7/04* | (2006.01) |

(52) U.S. Cl.
CPC ............... *H04B 7/0871* (2013.01); *H04B 7/06* (2013.01); *H04B 7/0404* (2013.01)

(58) Field of Classification Search
CPC combination set(s) only.
See application file for complete search history.

(56) References Cited

U.S. PATENT DOCUMENTS

| | | | |
|---|---|---|---|
| 6,961,545 B2 | 11/2005 | Tehrani et al. | |
| 8,325,632 B2 | 12/2012 | Gorbachov | |
| 8,441,913 B2 | 5/2013 | Li et al. | |
| 2008/0064356 A1* | 3/2008 | Khayrallah | H04B 7/082 455/277.1 |
| 2010/0272204 A1* | 10/2010 | Fazel | H04B 7/0608 375/267 |
| 2011/0051636 A1* | 3/2011 | Van Nee | H04B 7/0452 370/310 |

* cited by examiner

*Primary Examiner* — Bob Phunkulh
(74) *Attorney, Agent, or Firm* — Nathan & Associates Patent Agents Ltd; Menachem Nathan

(57) ABSTRACT

Systems for supporting multi-channel dynamically controlled diversity reception in wireless communications include a plurality M of receivers coupled to M antennas and configured handle N communication channels wherein $N \leq M \leq (2*N-1)$ and N channel state machines configured to dynamically allocate multiple channels of the N channels to the M receivers to support dynamic switched diversity for multi-channel dynamically controlled reception. Each channel state machine is configured to control the operation of each receiver. Arbitration is performed between channel state machines when such channel state machines work concurrently. In some embodiments, a lock state machine inside each channel state machine accelerates the locking time of a receiver based on at least one parameter received from another receiver.

16 Claims, 4 Drawing Sheets

METHOD AND SYSTEM FOR SUPPORTING MULTI-CHANNEL DYNAMICALLY CONTROLLED DIVERSITY RECEPTION

CROSS REFERENCE TO EXISTING APPLICATIONS

This application is related to and claims priority from U.S. Provisional Patent Application No. 61/977,237 titled "Method and system for supporting dual-channel and diversity using two receivers" and filed Apr. 9, 2014, which is incorporated herein by reference in its entirety.

FIELD

Embodiments of the invention relate in general to wireless communication systems and methods, and in particular to systems and methods for dynamically controlled diversity reception of a plurality of different channels allocated dynamically to receivers.

BACKGROUND

Some wireless communication standards have a spectrum allocation of multiple wireless channels (frequency bands), where each channel has a distinct functionality and where several channels need to be processed concurrently. The channels are completely independent, receiving packets from different sources at different times. For example, the vehicle-to-vehicle (V2V) communication IEEE standard has seven allocated channels, of which one is allocated for safety and others for services. Concurrent reception of both the safety channel and of a service channel is required.

Antenna diversity is a well-known method to improve the communication quality. Some implementations combine the signals from all antennas for maximal reception quality. This approach is called "full diversity". Other implementations use only a subset of the antennas, since the number of processing elements denoted as "receivers" is lower than the number of antennas. The field of "switching diversity" or "switched diversity" involves studies of preferred antenna selection methods. A full diversity solution is more expensive than a switching diversity solution, because the size and complexity of full diversity implementation are higher. However, full diversity provides better communication quality.

The switching diversity theory is focused on receiving a single source of data (single channel) at a time. However, in some communication environments such as V2V, independent data links are handled concurrently in different channels. Each channel uses a different frequency.

Some V2V communication installations (or "systems") mandate the use of two antennas for omni-directional antenna pattern. For full diversity implementation of two channels, the number of receivers has to be twice the number of channels, as two receivers have a fixed allocation to one channel. For example, a vehicle can use a single antenna if the antenna is positioned on the top of its roof. Other vehicles, like vehicles without observable antennas, need two antennas positioned either on windows, bumpers or side-mirrors.

The term "dynamic control" with reference to receivers is known. Dynamically controlled diversity receivers are capable of performing various diversity receiving and processing schemes, however involving only one channel. The term "dynamic control" with reference to a receiver also refers to the configuration and capability of a receiver to select one or two antennas for reception of a single channel.

FIG. 1A illustrates a known wireless communication system 100 that supports reception of two channels with full antenna diversity. System 100 includes exemplarily two antennas A and B that serve two channels. Each antenna covers a partial antenna. Together, the two antennas provide omnidirectional pattern. A splitter and combiner "block" per antenna (respectively blocks 102 and 104) is needed to operate two different channels with a single antenna. The splitter and combiner block is used to reduce the number of antennas. For example, blocks 102 and 104 could be dispensed with if four antennas were implemented and each antenna was routed directly to a receiver. Four receivers 106, 108, 110 and 112 are needed for implementation of full availability of this scheme. System 100 further includes two "full diversity" receivers 114 and 116, each receiving two antennas and performing full diversity reception. Each receiver outputs a respective channel, respectively channels 1 and 2. Such a system is feasible but expensive and requires a large physical size.

FIG. 1B illustrates a known wireless communication system 100' that supports reception of two channels with switched antenna diversity. System 100' is similar to system 100 but includes two diversity switches 122 and 124 coupled respectively to two "regular" receivers 126 and 128 instead of the two full diversity receivers 114 and 116. Each diversity switch receives two antennas and selects one antenna for processing at the respective receiver. Each receiver processes a single antenna and outputs a single channel (respectively channels 1 and 2) but does not provide receiver gain. The switching control is described in known switched diversity art. Such a system is feasible but shows limited performance where diversity gain is needed.

There is therefore a need for, and it would be highly desirable to have systems and related methods that handle multiple channels with dynamically controlled diversity reception, i.e. with a number of receivers that is smaller than twice the number of channels, to reduce system cost and size.

SUMMARY

Embodiments disclosed herein relate to wireless communication systems that handle multiple data streams (multiple channels) with dynamically controlled diversity reception, i.e. with a number of receivers smaller than twice the number of channels. Each receiver is associated with a receiver chain (not shown). Hereinafter, "receiver" and "receiver chain" (or simply "chain") may be used interchangeably. Dynamically controlled reception as disclosed herein, in which the number of receivers is smaller than twice the number of channels, is termed "multi-channel dynamically controlled diversity reception" or "multi-channel multi-receiver dynamically controlled diversity reception". In various embodiments, some of which are described in detail hereinbelow, multi-channel dynamically controlled diversity reception is applied to multiple channels by using (or performing) dynamic multiple channel allocation.

In some multi-channel dynamically controlled diversity reception system and method embodiments disclosed herein, the number of receivers can be equal to the number of channels, providing a system with minimal antenna count but with some compromised availability. In some embodiments, the number of receivers is larger than the number of channels but smaller than twice the number of channels. While described in detail with reference to two antennas, systems and methods disclosed herein can be generalized to support more antennas, for example three antennas. In an embodiment there is provided a system for wireless communication, comprising a plurality M of receivers coupled to M antennas and configured to handle N communication channels wherein $N \leq M \leq (2*N-1)$ and N channel state machines configured to dynamically allocate multiple channels of the N channels to the M receivers to support dynamic switched diversity for multi-channel dynamically controlled reception. In an embodiment, a system further includes an arbitration component configured to arbitrate between channel state machines when such channel state machines work concurrently. The arbitration may include allocation of a different time slot to each channel state machine or includes allocation of an available receiver per priority of a processed channel. In an embodiment, each channel state machine is configured to control the operation of each receiver. In an embodiment, each receiver is dynamically configured to process a single channel. In an embodiment, a system further includes a fast lock control mechanism operative to accelerate the locking time of one receiver based on at least one parameter received from another receiver. The fast lock mechanism may include, for each channel state machine, a lock state machine configured to receive an input parameter and a copy command parameter from another lock state machine. The input parameter may be an initial receiver gain, a frequency shift or a combination of the two. The copy command parameter may include a set gain command, a frequency shift command and a combination of the two.

In an embodiment there is provided a method for wireless communication, comprising steps of providing a plurality M of receivers coupled to M antennas and configured to handle N communication channels wherein $N \leq M \leq (2*N-1)$, and dynamically allocating the N channels to the M receivers while considering channel priority, thereby supporting dynamic switched diversity for multi-channel dynamically controlled reception. The step of dynamically allocating may include configuring N channel state machines to perform dynamic allocation of multiple channels to receivers and dynamically configuring each receiver to process a single channel. The dynamic configuring may include accelerating the locking time of one receiver based on at least one parameter received from another receiver. The acceleration is performed by a lock state machine included in each channel state machine, each lock state machine configured to receive an input parameter and a copy command parameter from another lock state machine.

In an embodiment, a method further includes the step of arbitrating between channel state machines when such channel state machines work concurrently. The arbitration may include allocating a different time slot to each channel state machine, or allocating an available receiver per priority of a processed channel.

BRIEF DESCRIPTION OF THE DRAWINGS

Non-limiting embodiments are herein described, by way of example only, with reference to the accompanying drawings, wherein.

DETAILED DESCRIPTION

Figure 1A:
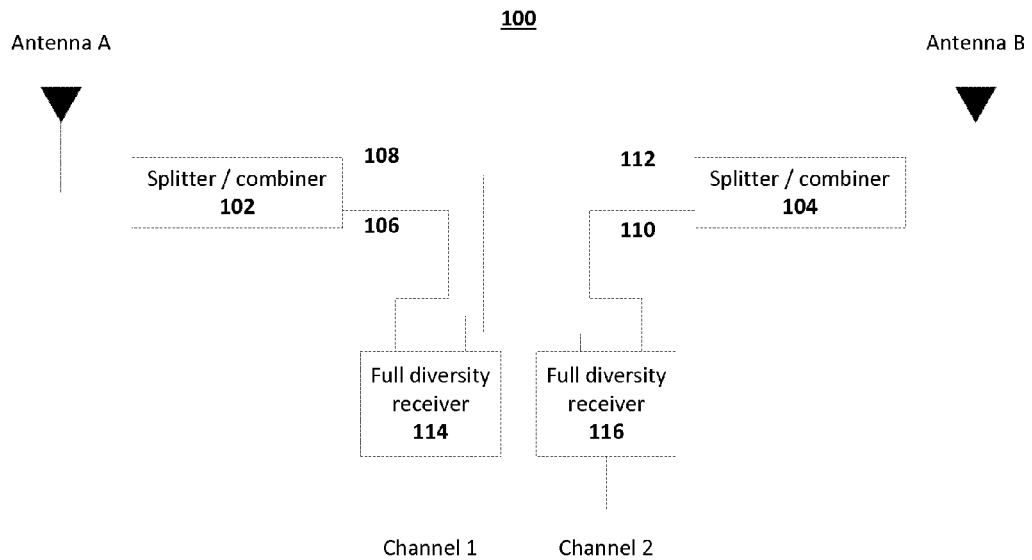
FIG. 1A illustrates a known wireless communication system that supports reception of two channels with antenna full diversity.
Figure 1B:
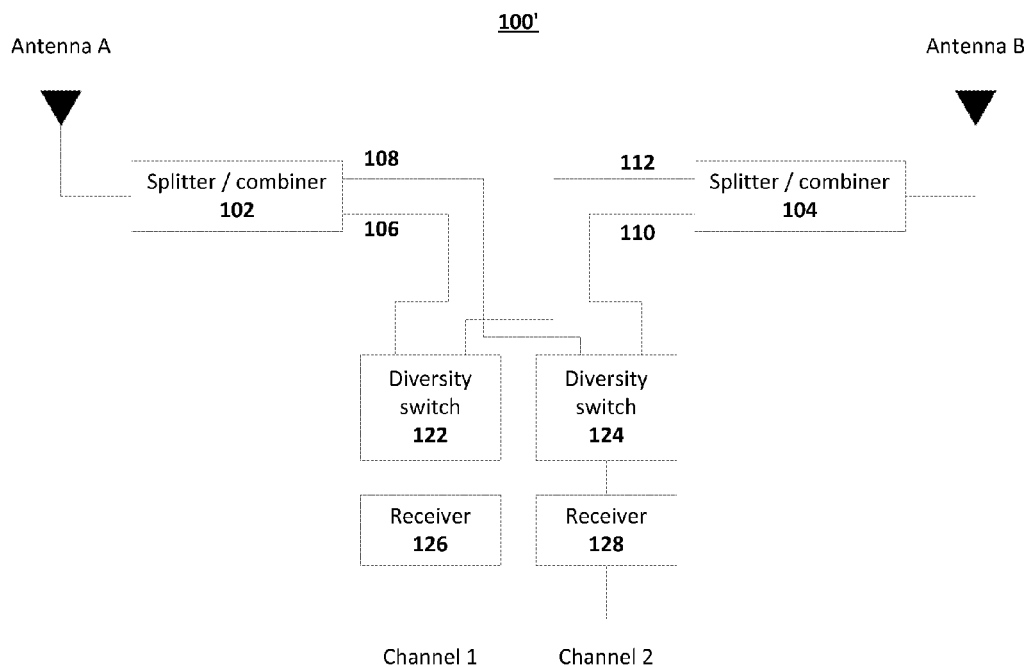
FIG. 1B illustrates a known wireless communication system that supports reception of two channels with antenna switching diversity.
Figure 2A:
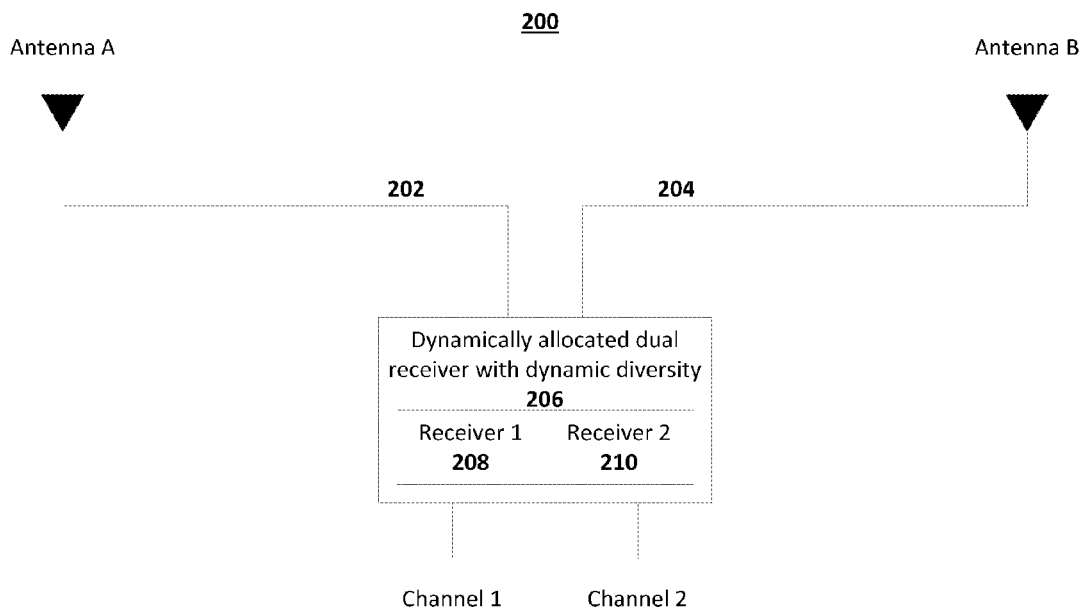
FIG. 2A illustrates an embodiment of a wireless communication system that supports two-channel two-receiver dynamically controlled diversity reception.

FIG. 2A illustrates an embodiment numbered 200 of a wireless communication system that supports two-channel two-receiver dynamically controlled diversity reception. System 200 includes two antennas, a first antenna A and a second antenna B coupled through respective receivers and inputs 202 and 204 to a dual-channel dynamically controlled receiver 206 that includes two receivers, a receiver 208 and a receiver 210. In system 200, the number of receivers is equal to the number of channels. Each antenna has a fixed route to dual-channel dynamically controlled receiver 206, but since receiver 206 can be dynamically allocated to each channel, each antenna can serve both channels. The system outputs channels 1 and 2, where the output is taken from the receiver currently allocated for the channel. This means that output channel 1 can result from receiver 208, receiver 210 or a combination of both receivers. Similarly, output channel 2 can result from receiver 208, receiver 210 or a combination of both receivers. The cost is halved relative to that of system 100 in FIG. 1A. The complexity of RF design is lower, due to the elimination of splitter and combiner blocks 102 and 104 of system 100.

An additional advantage of system 200 is the ability of each receiver 208 and 210 to be dynamically allocated to a different channel, and the combination of this ability with multi-channel dynamically controlled diversity reception, a combination that decides which antenna(s) will be used for reception.

In use, in an idle state when no packet is received, the two channels are monitored continuously, each by a different receiver (routed to a fixed antenna). When a packet start is detected under certain conditions (e.g. once measured packet energy crosses a threshold and signal properties are validated), one receiver receives the channel in which the packet start is detected. The other receiver is then dynamically allocated to the channel by switching to receive the channel. That is, both receivers process the preamble of the same packet. If antenna diversity provides a noticeable reception processing gain (e.g. an improvement from, for example, a 40% expected packet error to 10% expected packet error), more specifically if the measured packet energies at both antennas are similar, and if the probability of receiving a packet at a single antenna without diversity is below a preset target (exemplarily 1% or 10%), both receivers will keep receiving the same channel in diversity mode. Otherwise, the receiver with the higher measured packet energy chain will receive the packet, while the other receiver will return to monitor the other channel.

System 200 and its method of use ensure that availability to receive a packet from any source is as high as possible, and that diversity gain is provided when needed and possible. The scheme can allocate different importance priority to each channel and set a different availability target for each channel by allocating priorities to an arbitration component (306 in FIG. 3). For example, in V2V communication, one channel is used for safety, which should have perfect or near perfect availability, while the other channels are used for services, where availability can be compromised.

Figure 2B:
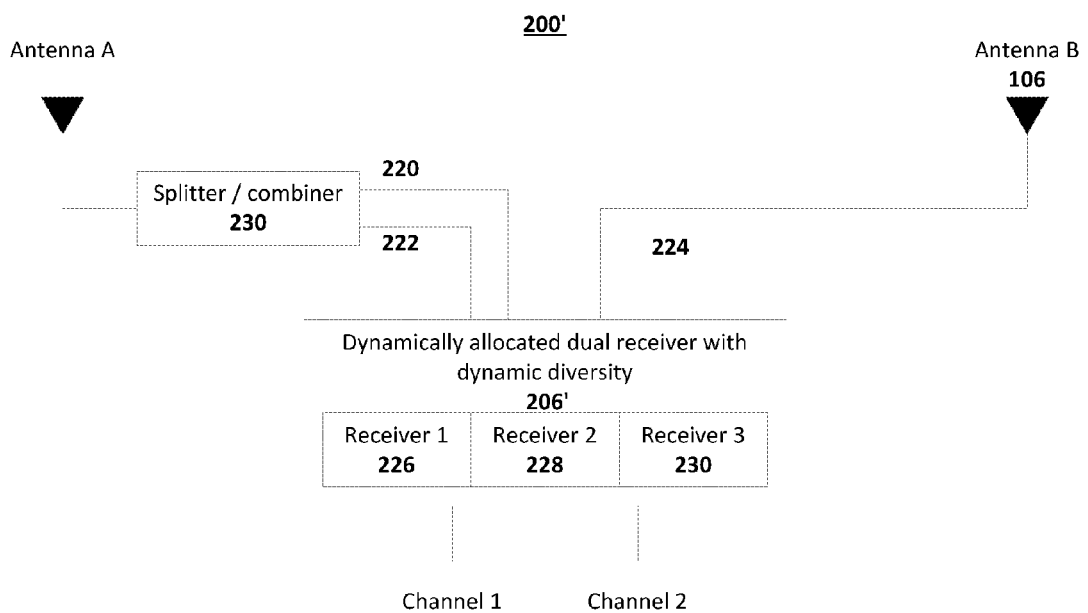
FIG. 2B illustrates an embodiment of a wireless communication system that supports three-channel three-receiver so dynamically controlled diversity reception.

FIG. 2B illustrates an embodiment numbered 200' of a wireless communication system that supports three-channel three-receiver dynamically controlled diversity reception. The system illustrated in FIG. 2B has a higher number of receivers than the number of channels but a lower number of receivers than twice the number of channels. Like system 200, system 200' includes a first antenna A and a second antenna B. These antennas are coupled through three receivers 220, 222 and 224 to a three-channel dynamically controlled receiver 206' having 3 receivers 226, 228 and 230. Receivers 220 and 222 are routed directly to antenna A via a splitter/combiner block 232. Receiver 224 is routed directly to antenna B. In use, both channels monitor continuously antenna A. Antenna B serves one channel based on need. Three-channel dynamically controlled receiver 206' thus supports concurrent operation of 3 receivers. While receiver 206' is potentially more expensive than receiver 206, it provides full availability. Like system 200, system 200' provides dynamic allocation of receivers to channels and applies multi-channel dynamically controlled reception. The only difference lies in the added receiver resources in system 200'.

Figure 3:
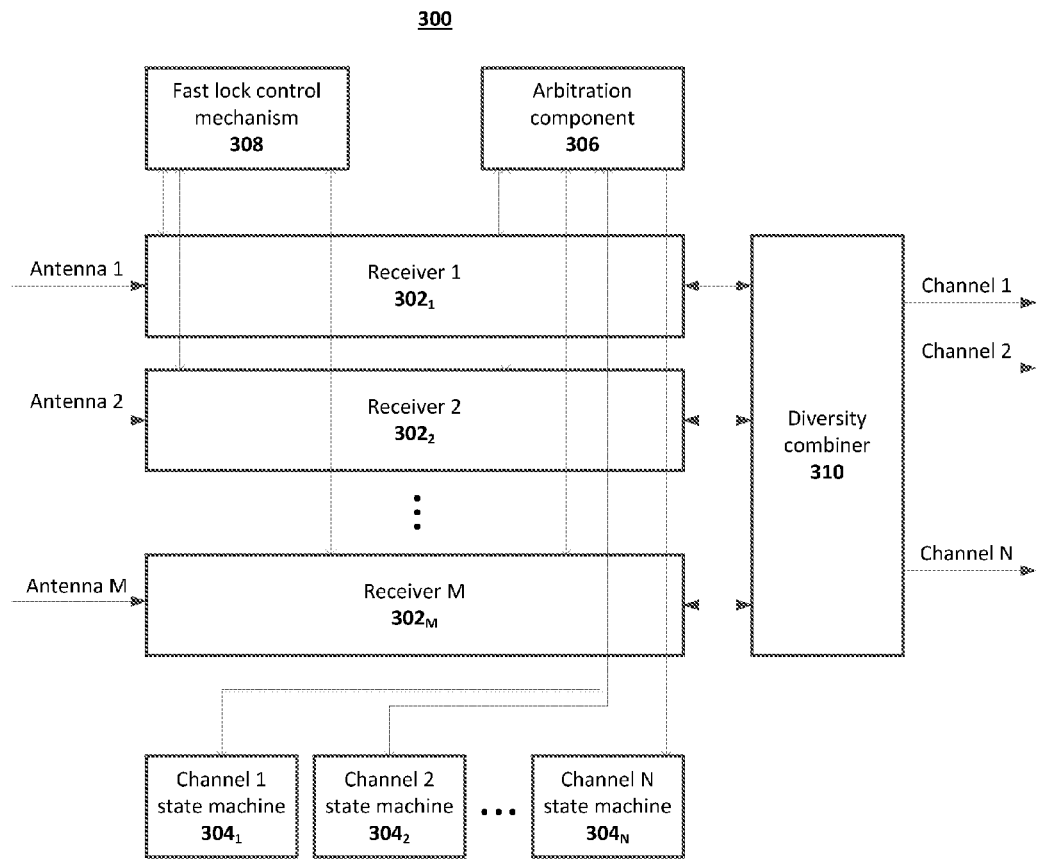
FIG. 3 illustrates an embodiment of a generalized wireless communication that supports multi-channel dynamically controlled diversity reception.

FIG. 3 illustrates an embodiment numbered 300 of a generalized wireless communication system with multi-channel dynamically controlled diversity reception. System 300 includes M receivers $302_{1-M}$ for processing N channels. M may vary between N and 2*N−1, where N is 2 or larger. It should be understood that the M receivers coupled to the N-channels provide a "N-channel M-receiver dynamically controlled receiver" (not shown). Each receiver can process a single channel, selected dynamically. Each receiver (and receiver) works in parallel with all other receivers. System 300 further includes N state machines marked $304_{1-N}$ for controlling the operation of each channel. Each state machine can control each receiver, determining the channel for processing and having indication about its activity and about the priority of the currently handled channel. In other words, the channel state machines perform dynamic allocation of receivers. System 300 further includes an arbitration component 306 that coordinates between the various state machines that work concurrently. Arbitration component 306 may be a hardware (HW) component or a software (SW) module. Arbitration component 306 may exemplarily implement arbitration schemes: 1) by allocating a different time slot to each channel state machine to ensure that at each given moment only one channel state machine can make decisions, or 2) by allocating available receiver per priority of processed channel and/or per need. System 300 further includes optionally a fast lock control mechanism 308 (typically HW, but also implementable as a SW module) that implements fast lock functionality of a receiver 302. The entire locking process needs to converge in a very short time, during packet preamble. System 300 further includes a diversity combiner 310 for exchanging dynamically information between two or more receivers in order to provide diversity gain. The diversity combiner allows the receivers handling the same channel to process the channel collectively.

Figure 4:
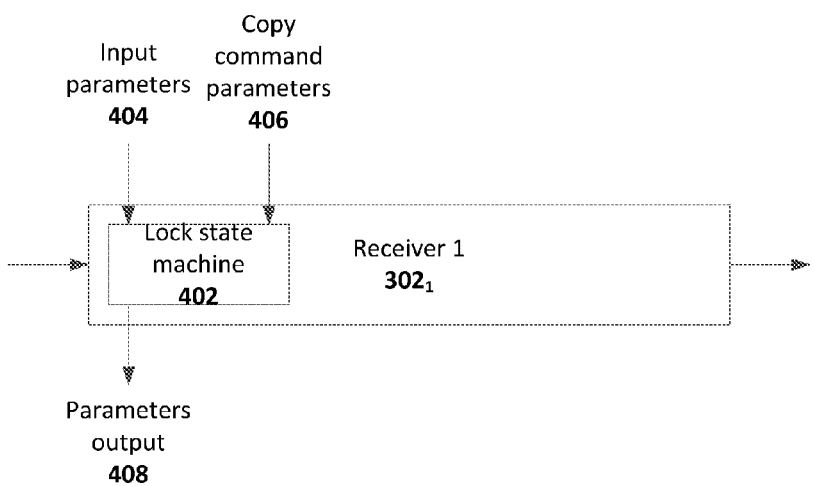
FIG. 4 illustrates the operation of the fast lock control component in FIG. 3.

FIG. 4 provides details of the fast lock control mechanism 308 in FIG. 3. A lock state machine 402 (which is a subset of a channel state machine 304 in FIG. 3) of a receiver is modified vs. a known art lock state machine to receive two inputs: an input parameter 404 and a copy command parameter 406. This means that the lock state machine dynamically changes from one receiver to another while adopting parameters existing in another lock state machine. This is in contrast with known lock state machines, which have no input. Such known lock state machines base their decision solely on the received signal. In known systems, there is no ability to exchange information between different lock state machines in order to accelerate locking of a lock state machine based on the temporal parameters of another state machine. When a command 406 to copy a parameter from a first receiver to a second receiver is issued by a channel state machine 304 after deciding to use the second receiver to process the channel, input parameter 404 and copy command parameter 406 are loaded to the lock state machine of the respective channel state machine and are used. Exemplarily, input parameter 404 may include an initial receiver gain and/or a frequency shift of the second receiver to minimize the time needed for measuring both the initial receiver gain and the frequency shift of the second receiver. An exemplary command may be "set gain to XX dB (where XX is for example 66 dB) and "apply a frequency shift of YY KHz" (where YY is for example 100 KHz). The parameters (input 404 and copy command 406) of the lock state machine are output at a parameters output interface 408, for use (if needed) by other receivers.

Figure 5:
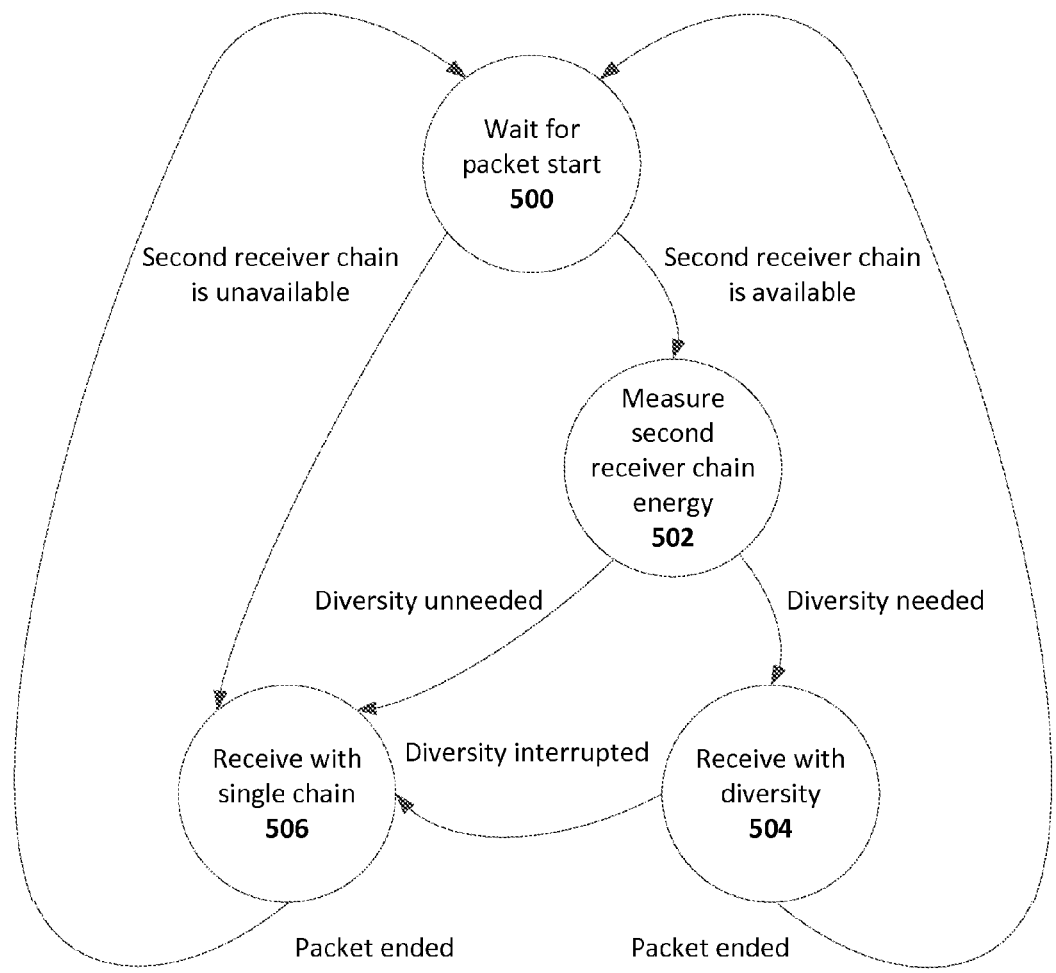
FIG. 5 shows a state flow diagram implemented per channel.

FIG. 5 shows a state flow diagram implemented per channel. N parallel instances of the state machine exist and work concurrently. This generic flow applies to any values of N and M. A particular state machine waits in an initial state 500 for packet start. The state machine relates to a single channel and can control two (first and second) receivers. A receiver may be available or unavailable. The receiver availability state may consider several properties:

a) Receiver activity: if the receiver is active then using it will interfere to the currently received packet. In that case, decision to use the receiver should be more cautious. If receiver is inactive, then nothing prevents from using it.

b) Measured packet energy: if the preliminary energy measurement is high, then there is no need to utilize the second receiver since the packet will be received anyhow.

c) Channel priority: if the first receiver is active and if the processed channel has lower priority, then the channel can be interrupted. If the processed channel has higher priority, then it cannot be interrupted.

d) Wireless properties: typically, wireless properties are unknown at packet start. However, if wireless properties information like delay spread or non-line-of-sight is available, then this information can be considered as well and may impact the decision. Complex wireless reception requires higher energy and will likely benefit more from diversity.

Once a packet start is detected, the flow leaves state 500. If a second receiver is unavailable, then the flow jumps to state 506, where a packet is received using a single antenna, i.e. the same antenna used for packet detection. The flow stops following packet end and the state machine returns to wait for a new packet start in state 500. If a second receiver is available when the state machine waits in initial state 500 and once a packet start is detected, the flow jumps to state 502. In state 502, the packet energy is measured by the second receiver and a decision to apply diversity or to receive using only a single antenna is based on the measured energy (for example, if the energy difference between energies measured at the two antennas is within a small value, for example 3 dB). If diversity is needed, then state 504 becomes active. If diversity is not needed, then state 506 becomes active. The receiver selected for reception is the one with the higher energy among the two. From both states 504 and 506, the flow returns to state 500 once packet transmission ends. From state 504, the flow can jump to state 506 if diversity was interrupted by another state machine with higher priority.

The decision of diversity activation after state 502 considers the energy difference between the two receivers: diversity provides gain only when the packet has similar energy (e.g. within about 3 dB) in both receivers. If the difference the energy measured in the two different receivers is too high (e.g. about 3 dB) then there is no need to activate diversity. One advantage of the flow above is the ability to implement dynamic allocation of a lock state machine and ability to adopt parameters from another lock state machine.

The state flow shown in FIG. 5 can operate with different considerations. For example, considerations after state 500 can be checked only after state 502. That is, checks such as a check if a receiver is available or unavailable or the consideration of properties mentioned above can be deferred to state 502 instead of being checked in state 500.

EXAMPLES OF OPERATION

Example 1

This example (related to FIG. 2A) involves a configuration of two channels and two receivers. Channel 1 has higher priority than channel 2. Receiver 1 monitors channel 1. Receiver 2 monitors channel 2. A packet is detected at channel 2. Regardless of any signal property, the lower priority of channel 2 indicates that only receiver 2 will be allocated for its reception, even if the packet energy is low. The current status is that receiver 1 monitors channel 1 and receiver 2 receives channel 2.

In continuation, a packet start is monitored for channel 1. The energy is low, and since channel 1 has higher priority, reception of channel 2 is interrupted and receiver 2 is now allocated for channel 1. The packet energy at receiver 2 is higher than measured at receiver 1, meaning that channel 1 can be received only from receiver 2. Receiver 1 becomes available, and is allocated for monitoring channel 2. The current status is that receiver 2 receives channel 1 and receiver 1 monitors channel 2. Thus, the packet received in channel 2 is lost.

Example 2

This example (related to FIG. 2B) involves a configuration of two channels and three receivers (with three receivers). Channel 1 has higher priority than channel 2. Receiver 1 monitors channel 1 and receiver 2 monitors channel 2. A packet is detected at channel 2. The packet energy is low, and since receiver 3 is available, it switches to channel 2 and measures the packet energy. The switching is done by a frequency change command and by applying the fast lock mechanism. The measured packet energy is similar to the packet energy measured at receiver 2, and therefore diversity reception is activated. The current status is that receiver 1 monitors channel 1, and receivers 2 and 3 is receive channel 2.

In continuation, a packet start is monitored for channel 1. The energy is low, and since channel 1 has higher priority, the diversity of channel 2 is interrupted and receiver 3 is now allocated to channel 1. The packet energy of receiver 3 is higher than that measured at receiver 1, and channel 1 is received only from receiver 3. The current status is that receiver 3 receives channel 1 and receiver 2 receives channel 2.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A system for wireless communication, comprising:
    a) a plurality M of receivers coupled to M antennas and configured to handle N communication channels, wherein $N \geq 2$ and wherein $N \leq M \leq (2N-1)$;
    b) N channel state machines configured to dynamically allocate multiple channels of the N channels to the M receivers to support dynamic switched diversity for multi-channel dynamically controlled reception;
    c) an arbitration component configured to arbitrate between channel state machines when such channel state machines work concurrently; and
    d) a fast lock control mechanism operative to accelerate the locking time of one receiver based on at least one parameter received from another receiver.

2. The system of claim 1, wherein the fast lock mechanism includes, for each channel state machine, a lock state machine configured to receive an input parameter and a copy command parameter from another lock state machine.

3. The system of claim 2, wherein the input parameter is selected from the group consisting of an initial receiver gain, a frequency shift and a combination thereof.

4. The system of claim 2, wherein the copy command parameter is selected from the group consisting of a set gain command, a frequency shift command and a combination thereof.

5. The system of claim 1, wherein each channel state machine is configured to control the operation of each receiver.

6. The system of claim 5, wherein each receiver is dynamically configured to process a single channel.

7. The system of claim 5, wherein the arbitration includes allocation of an available receiver per priority of a processed channel.

8. The system of claim 1 wherein the arbitration includes allocation of a different time slot to each channel state machine.

9. A method for wireless communication, comprising steps of:
    a) providing a plurality M of receivers coupled to M antennas and configured to handle $N \geq 2$ communication channels, wherein $N \leq M \leq (2N-1)$; and
    b) dynamically allocating the N channels to the M receivers while considering channel priority, thereby supporting dynamic switched diversity for multi-channel dynamically controlled reception, wherein the step of dynamically allocating includes configuring N channel state machines to perform the dynamic allocation of multiple channels to receivers and wherein the configuring N channel state machines to perform the dynamic allocation of multiple channels to receivers includes accelerating a locking time of one receiver based on at least one parameter received from another receiver.

10. The method of claim 9, wherein the accelerating is performed by a lock state machine included in each channel state machine, each lock state machine configured to receive an input parameter and a copy command parameter from another lock state machine.

11. The method of claim 10, wherein the input parameter is selected from the group consisting of an initial receiver gain, a frequency shift and a combination thereof.

12. The method of claim 10, wherein the copy command parameter is selected from the group consisting of a set gain command, a frequency shift command and a combination thereof.

13. The method of claim 9, wherein the step of dynamically allocating the N channels to the M receivers while considering channel priority includes dynamically configuring each receiver to process a single channel.

14. The method of claim 9, further comprising the step of arbitrating between channel state machines when such channel state machines work concurrently.

15. The method of claim 14, wherein the step of arbitrating includes allocating a different time slot to each channel state machine.

16. The method of claim 14, wherein the step of arbitrating includes allocating an available receiver per priority of a processed channel.

* * * * *